United States Patent
Moreth, III

(10) Patent No.: US 8,624,166 B2
(45) Date of Patent: Jan. 7, 2014

(54) SYSTEM FOR SUPPORT OF A ROTATIONAL PANEL IN A CAROUSEL INFRARED OVEN

(75) Inventor: R. Edward Moreth, III, Fort Lauderdale, FL (US)

(73) Assignee: Remco Technologies, Inc., Fort Lauderdale, FL (US)

( * ) Notice: Subject to any disclaimer, the term of this patent is extended or adjusted under 35 U.S.C. 154(b) by 677 days.

(21) Appl. No.: 12/696,286

(22) Filed: Jan. 29, 2010

(65) Prior Publication Data

US 2010/0193500 A1 Aug. 5, 2010

Related U.S. Application Data

(60) Provisional application No. 61/206,812, filed on Feb. 4, 2009.

(51) Int. Cl.
| | |
|---|---|
| F24C 7/10 | (2006.01) |
| F27B 9/06 | (2006.01) |
| A21B 1/00 | (2006.01) |
| A21B 1/22 | (2006.01) |

(52) U.S. Cl.
USPC ........... 219/388; 219/386; 219/391; 219/392; 219/402; 219/409

(58) Field of Classification Search
USPC ............... 219/386, 388, 391–392, 402, 409
See application file for complete search history.

(56) References Cited

U.S. PATENT DOCUMENTS

| | | | | |
|---|---|---|---|---|
| 5,492,055 | A * | 2/1996 | Nevin et al. | 99/331 |
| 6,250,210 | B1 | 6/2001 | Moreth | |
| 7,019,265 | B2 * | 3/2006 | Coleman | 219/396 |
| 2003/0089243 | A1 * | 5/2003 | Chung | 99/451 |
| 2006/0124627 | A1 * | 6/2006 | Friedl et al. | 219/411 |

* cited by examiner

*Primary Examiner* — Mohsen Ahmadi
(74) *Attorney, Agent, or Firm* — Melvin K. Silverman

(57) ABSTRACT

A system for support and securement of a thermal heating panel of a carousel oven upper a rotational axle includes a flat upper receiver formed of several diametric strips. The upper receiver is proportioned for complemental receipt of the heating panel. At, or integrally secured to, the bottom of the upper receiver, and situated polarly symmetrically about the axle, is a cradle proportioned for complemental fit upon a male drive shaft at an uppermost end of the axle. Due to the weight of the heating panel and its slow rate of rotation within the carousel oven, the force of gravity of the heating panel is sufficient to maintain the upper receiver and its cradle upon the male drive plate even in the absence of positive securement between the elements. Alternatively, the heating panel is entirely replaced by a grill-like surface, secured above or below the diametric strips to permit the grilling of types of meat or food other than those typically cooked upon the thermal plate panel. In to the grill-like surface may be formed pie-like recesses into which pods are placed, each provided with different quantity or type of food.

1 Claim, 12 Drawing Sheets

PRIOR ART

SYSTEM FOR SUPPORT OF A ROTATIONAL PANEL IN A CAROUSEL INFRARED OVEN

CROSS REFERENCE TO RELATED APPLICATION

This application claims the benefit under 35 USC 119 (e) of the provisional patent application Ser. No. 61/206,812, filed Feb. 4, 2009, which is hereby incorporated by reference in its entirety.

BACKGROUND OF THE INVENTION

The present invention relates to an area of improvement in an infrared carousel oven of the type taught in U.S. Pat. No. 6,250,210 (2001) entitled High Efficiency Carousel Infrared Oven.

The prior art as exemplified in said item is shown in FIGS. 1 thru 3 herewith. Therein is shown a cooking panel 19 within the generally cylindrical envelope of oven 21 having a roof 39 in which the circular panel 19 (see also FIG. 2) is mounted upon an axle 23 (see FIGS. 1 and 3). Cooking panels that are used within infrared in other high energy intensity environments are typically formed of a material such as calcium aluminate which is able to store large quantities of heat and operate at temperature of at least 2200 degrees Fahrenheit. Panel 19 is thus formed of a high thermal capacity material having parameters in a range of about 0.24 BTUs/pounds/degree Fahrenheit or 75,000 BTUs, given the weight of the illustrated assembly.

Panel 19 when mounted upon axle 23 will typically be enclosed by a journal 26. This assembly, inclusive of axle 23, is in turn rotated by a gear assembly 28. The arrows within FIG. 1 show the various forms and direction of heating to which heating panel 19 is subjected, this inclusive of burners 29 in the oven 21. At the top of FIG. 1 is shown flue 27 within roof 39. Also shown in FIG. 1 is axle journal 25.

Over the last approximately ten years of usage of high efficiency carousel infrared ovens and the like, it has been found that interface or connection 32 (see FIG. 3) between axle 23 and panel 19 will eventually degrade, thereby disabling the entire system as the connection between panel 19 and axle 23 erodes. Accordingly, a need has arisen in the art for an improved method of connection between heating panel 19 and rotational axle 23. The present invention is thereby directed to a solution to this problem.

SUMMARY OF THE INVENTION

A system for support and securement of a thermal heating panel of a carousel oven to a rotational axle thereof is set forth. The system includes a flat upper including a plurality of diametric strips formed of a high density material, the upper receiver proportioned for complemental receipt of the heating panel. Situated at, or integrally secured to the bottom of the upper receiver, and situated polarly symmetrically about said axle, is a cradle proportioned for complemental fit upon a male drive shaft formed at an uppermost end of said rotational axle. Due to the weight of the heating panel and its slow rate of rotation within the carousel oven, the force of gravity of the heating panel is sufficient to maintain the upper receiver and its cradle upon the male drive plate even in the absence of positive securement between said elements.

In an alternate embodiment, the heating panel itself is entirely replaced by the upper receiver. However, in said embodiment a grill-like surface is secured above or below the diametric strips to permit the cooking or grilling of types of meat or food other than that which would typically be cooked or heated upon the thermal plate panel of an oven carousel, such as an infrared carousel oven. The grill-like surface optionally may be formed in the geometry of pie-like or triangular recesses into which pods may be selectably placed, each of which may be provided with a different quantity, arrangement, or type of food. In this application of the invention, each pod may itself be covered by another grill surface.

It is an object of the present invention to provide a system for the support and securement of a thermal heating panel of a carousel oven to a rotational axle thereof.

It is another object to provide an improved means for securement and support of a heating panel through a rotational axle thereof to reduce or eliminate degradation of the contact between the axle and the thermal panel.

It is thus a further object of the invention to provide enhanced stability to a heating panel of a carousel oven.

It is a yet other object to provide a grilling surface for a carousel oven in which such surface is rotated by the oven.

The above and yet other objects and advantages of the present invention will become apparent form the hereinafter set forth Detailed Description of the Invention, Claims and Drawings herewith.

DETAILED DESCRIPTION OF THE INVENTION

Figure 1:
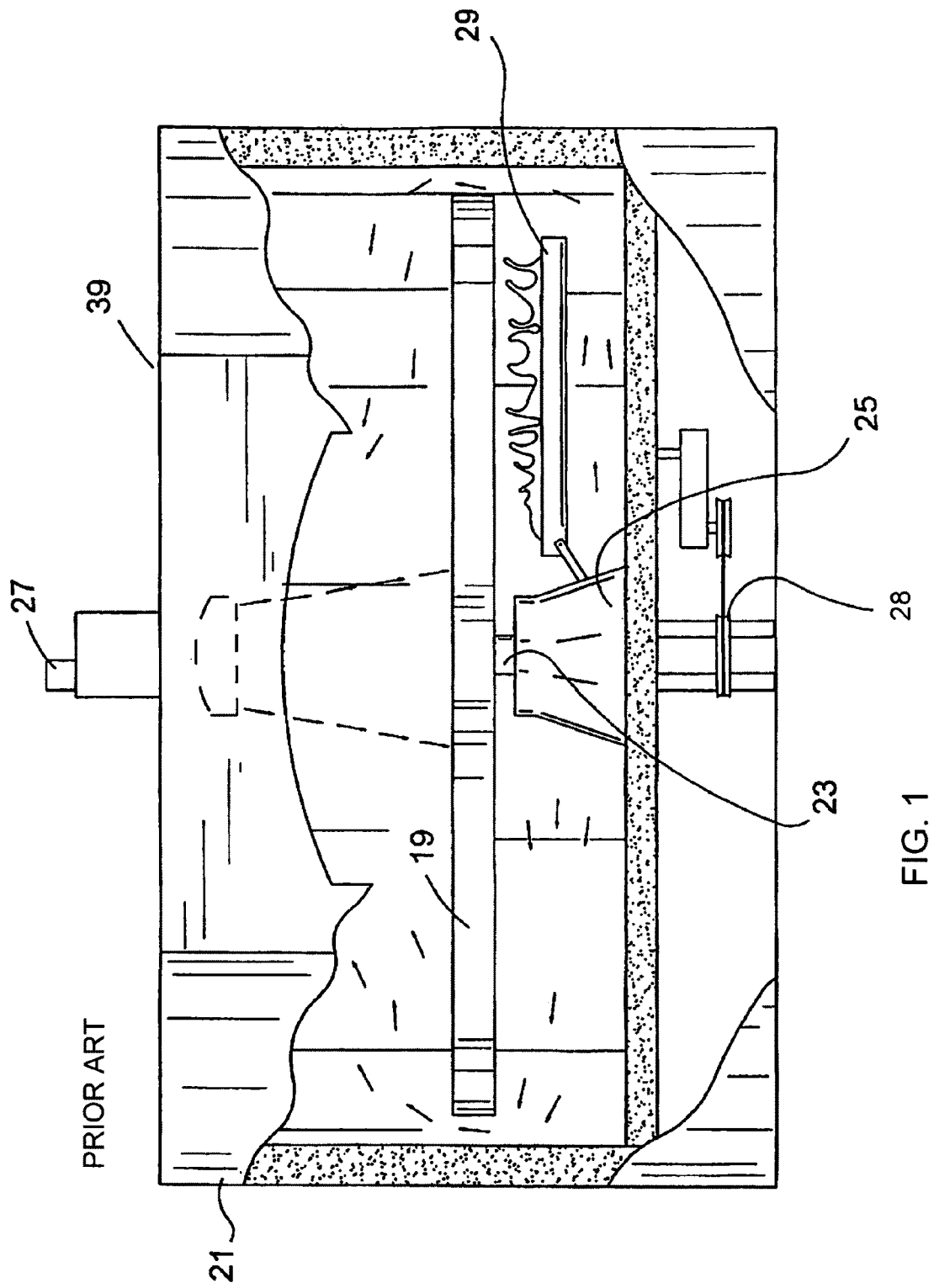
FIG. 1 is a front cutaway view of a prior art oven of the carousel infrared type.
Figure 2:
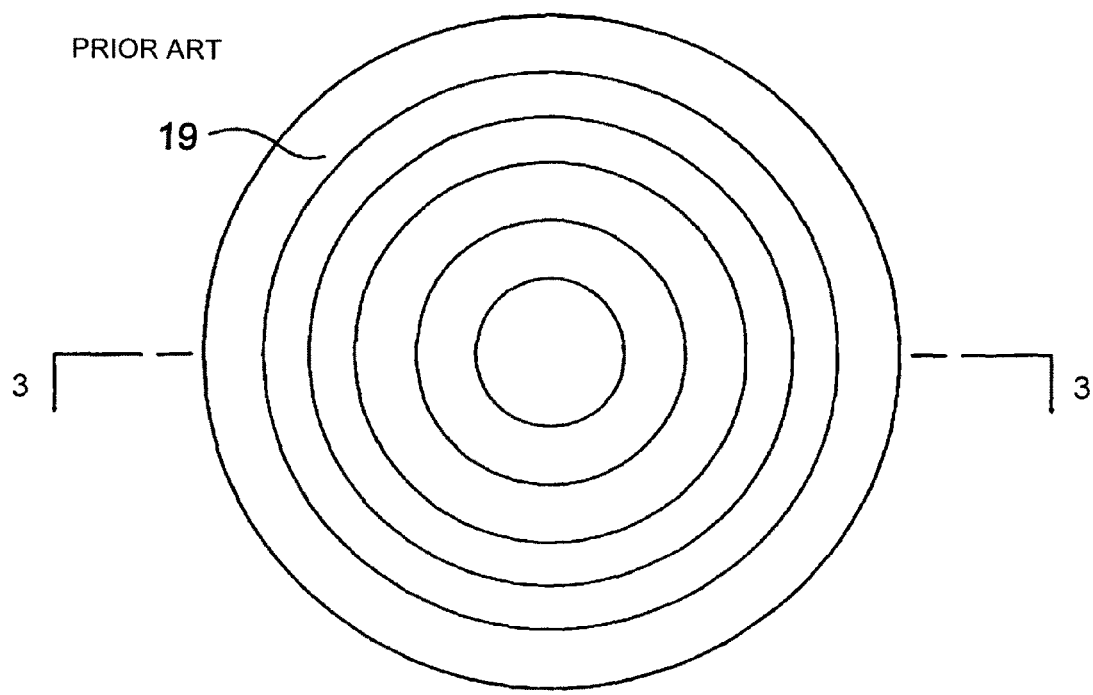
FIG. 2 is a top plan view of the heating panel of the oven of FIG. 1.
Figure 3:
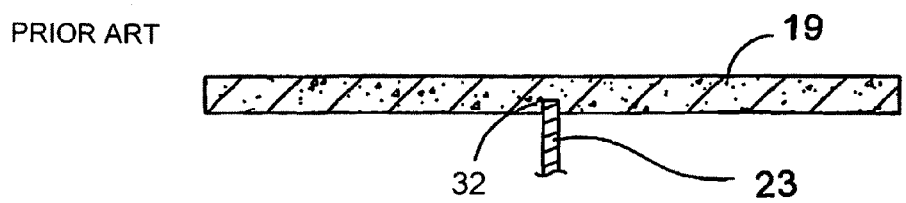
FIG. 3 is a vertical cross-sectional view of a heating panel taken along Line 3-3 of FIG. 2.
Figure 4:
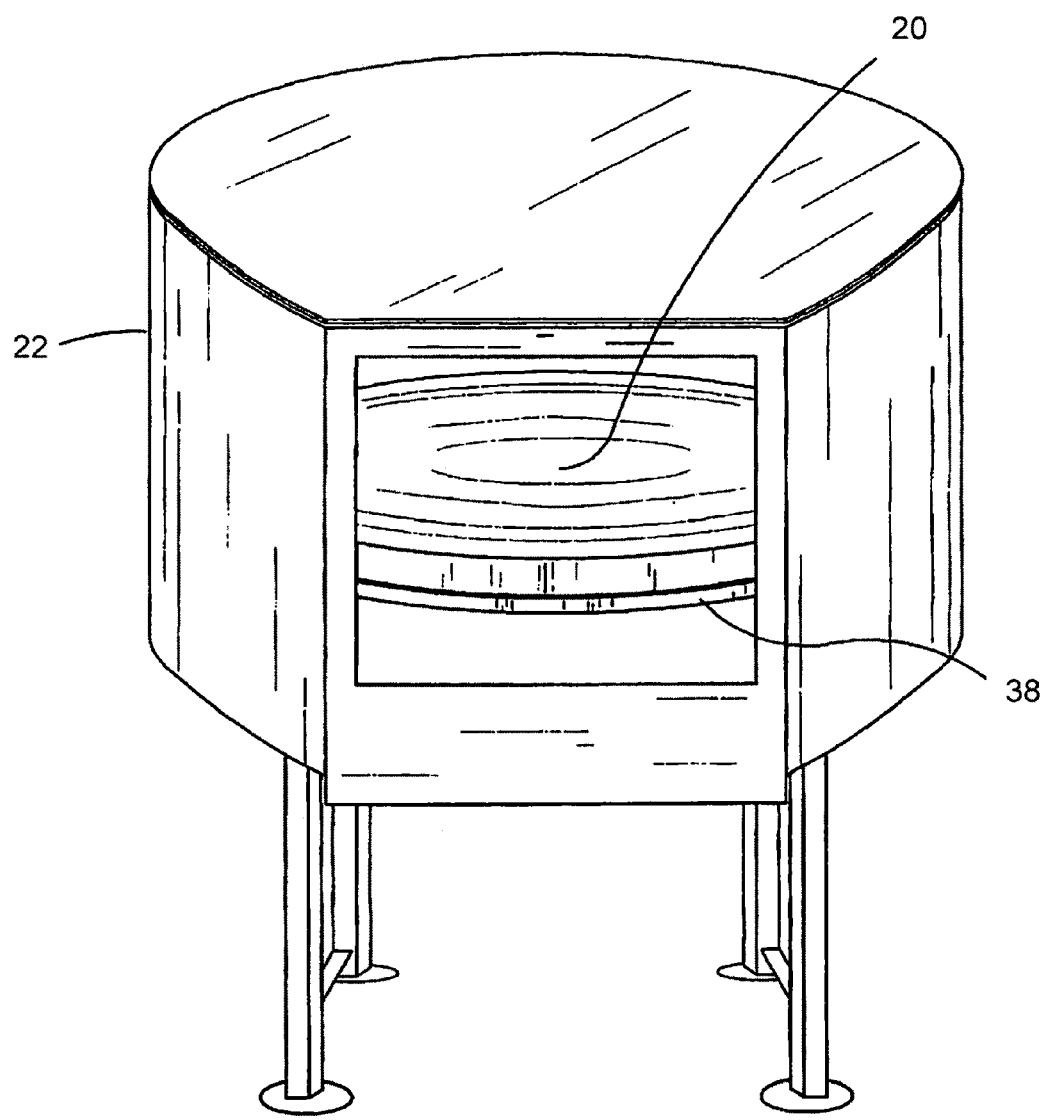
FIG. 4 is perspective assembly view of one embodiment of the present invention.
Figure 5:
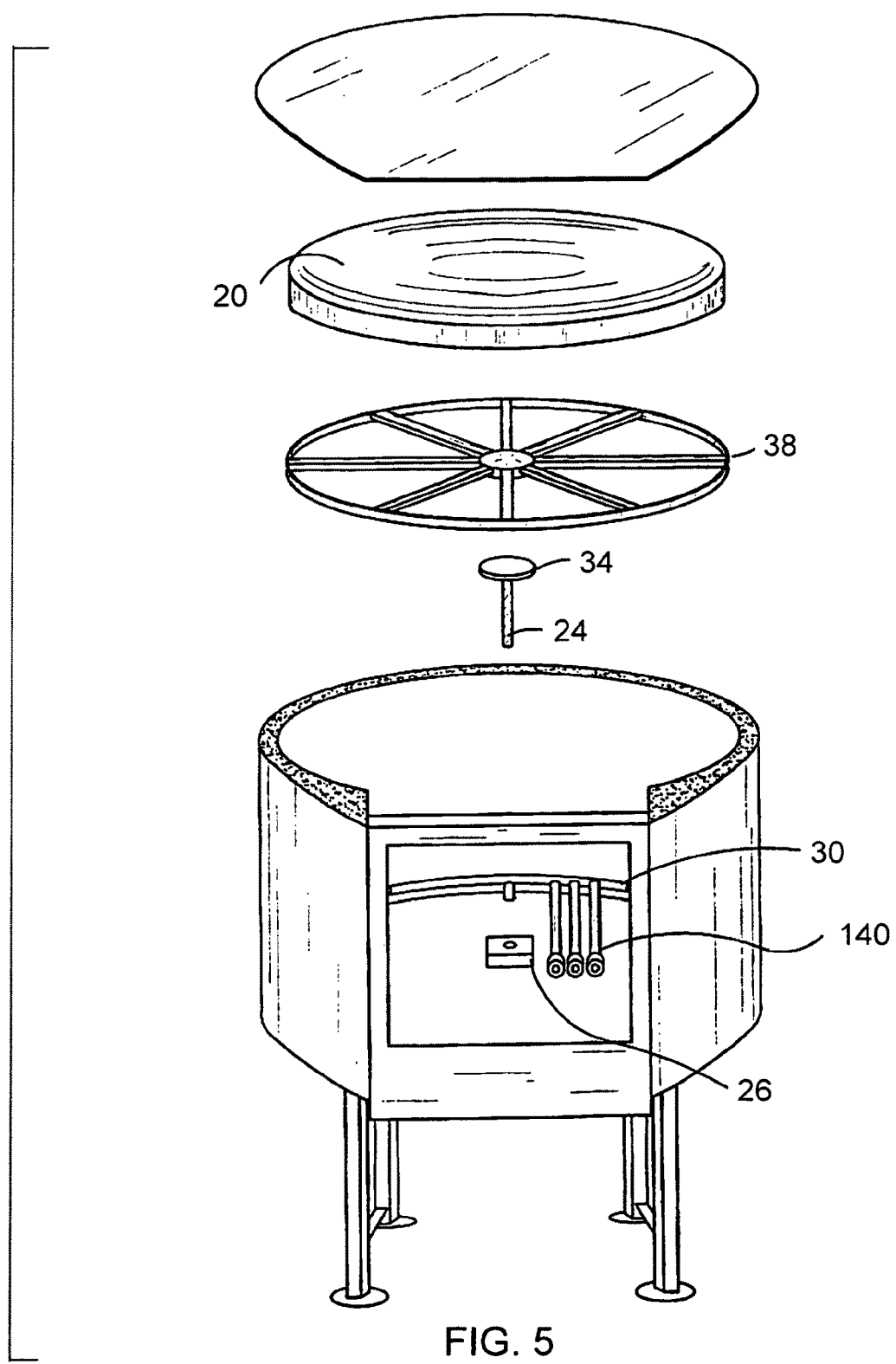
FIG. 5 is an exploded view of the embodiment shown in FIG. 4.
Figure 6:
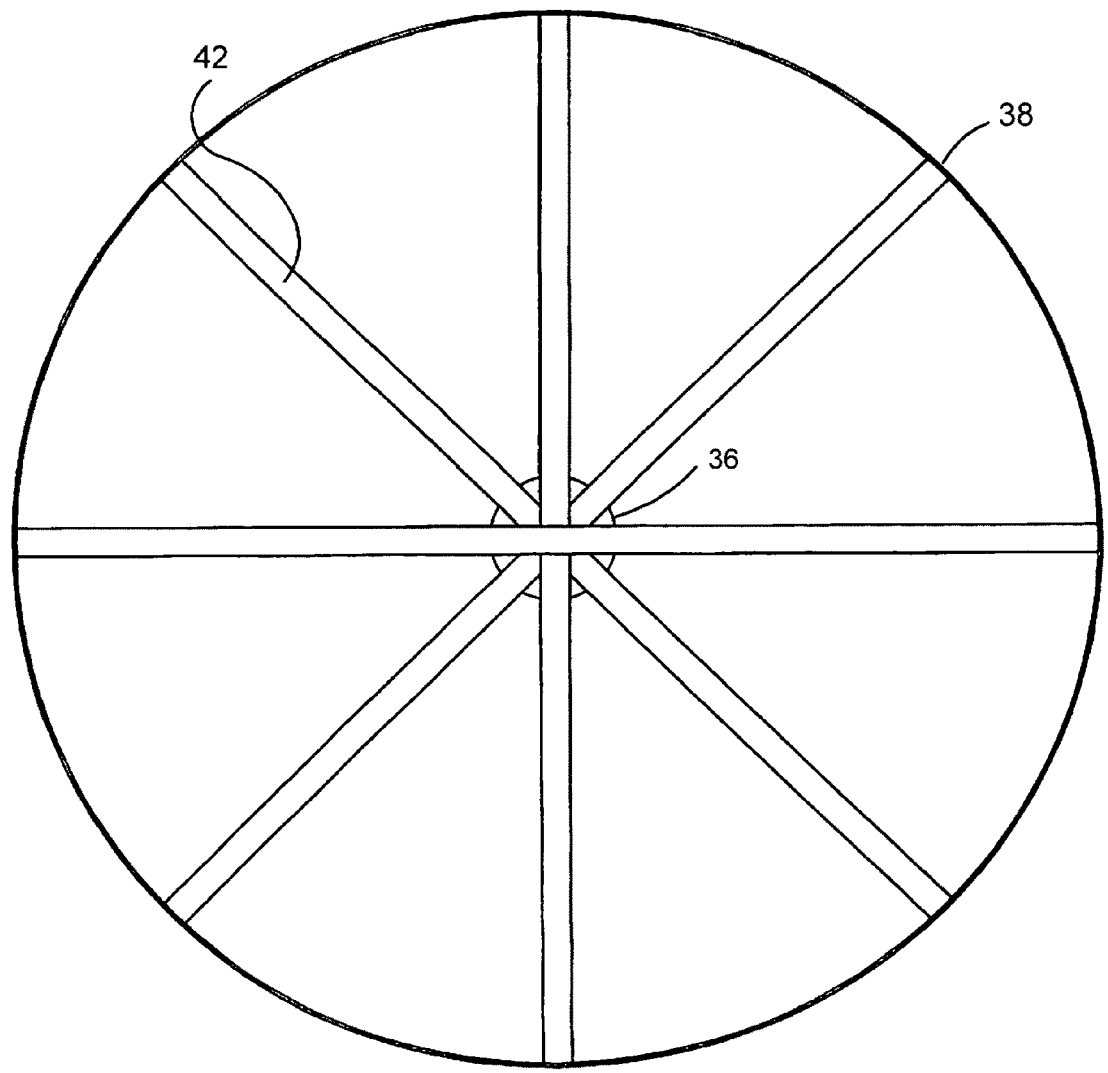
FIG. 6 is a top plan view of the upper receiver shown in the exploded view of FIG. 5.
Figure 7:
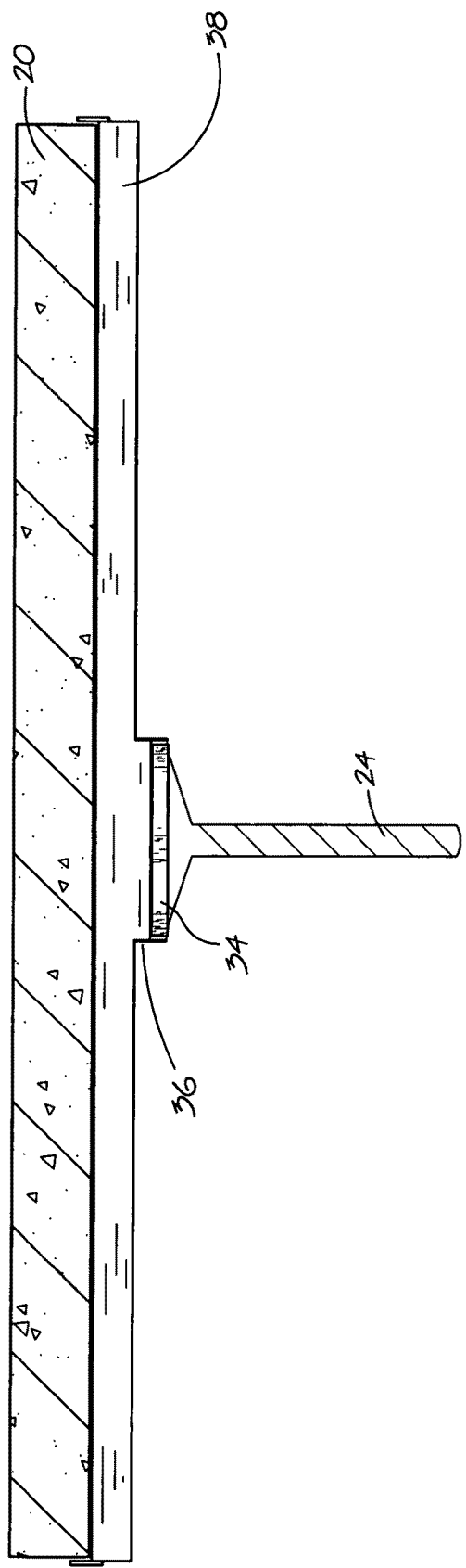
FIG. 7 is a cross-sectional assembly view of the embodiment of FIG. 4.

With reference to the embodiments of FIGS. 4-8, it may be noted, within housing 22 (see FIG. 4) that axle 24 is, at an uppermost end thereof provided with a male drive plate 34 upon which rests a female receiver 36 upon which in turn rests an upper cradle 38 which provides support for heating panel 20 that is complemental therewith. Receiver 36 constitutes an interface with upper cradle 38 (see FIGS. 5-6) and may be secured to the bottom thereof. As such, receiver 36 defines a stable interface between male drive plate 34 and upper cradle 38 which in turn supports rotational cooking panel 20. The weight of panel 20 and its slow rate of rotation permit a gravity-only interface between cradle 38 and drive plate 34. Also shown in FIG. 5 is gas burner supply channel 30.

It is to be appreciated that upper cradle 38 is formed of a plurality of diametric strips 42 that are of a material stronger than is the panel 20, i.e., the panel 20 is furnished with increased structural strength and stability due to the integrated effect of upper cradle 38 and the receiver 36. This arrangement is particularly easy to maintain inasmuch as the weight of cooking panel 20 is such that, in normal use of the carousel oven, will not tip the cradle relative to the male drive plate 34. However, if desired, the various above-described elements of the invention may be secured together by mechanical or bonding means.

As may be further appreciated, the weight and speed of the panel 20 is such that there is no loss of rotational force or torque between male drive plate 34 and panel 20 during normal operation of the carousel oven.

Figure 8:
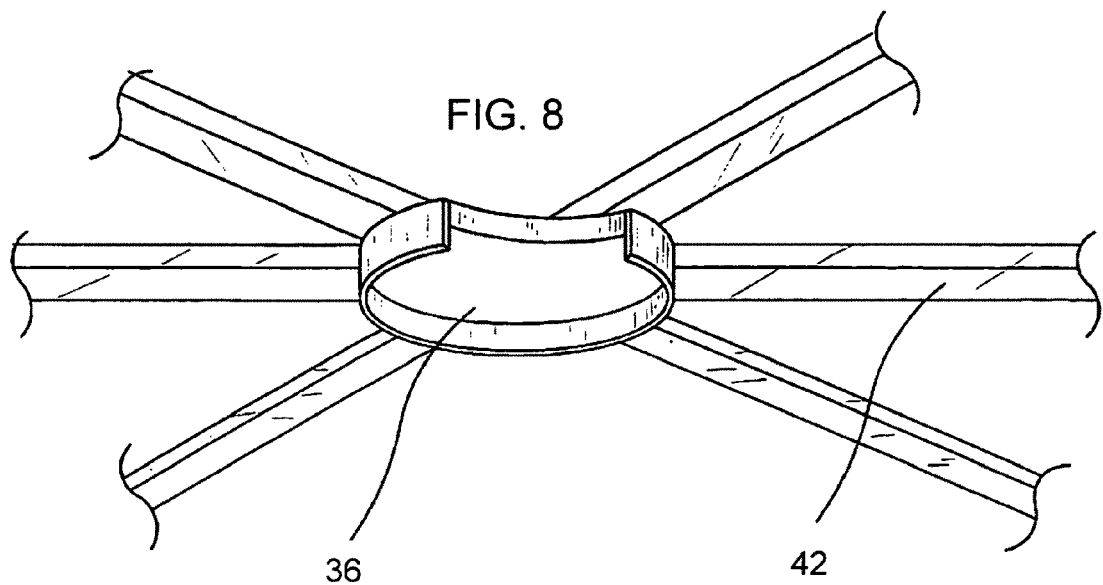
FIG. 8 is a partial breakaway view of a cradle portion of the view of FIG. 5.
Figure 9:
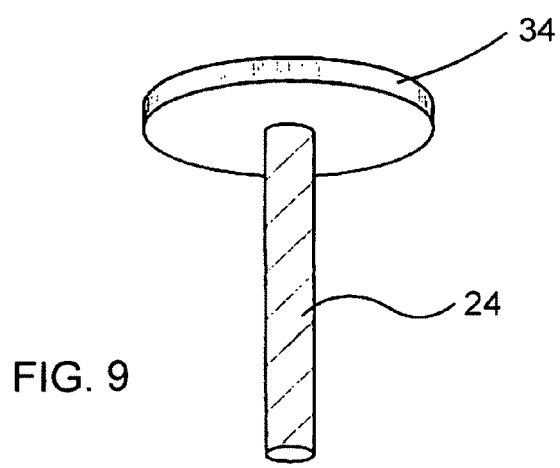
FIG. 9 is a front elevational view of system drive plate.

In the views of FIGS. 8 and 9, the physical dimensions of receiver 36 relative to male drive plate 34 may be seen. It is also to be appreciated that upper cradle 38 and receiver 36 may be integrally formed as a single piece such that cradle 38 with its integral receiver may be placed directly upon male drive plate 34.

Figure 10:
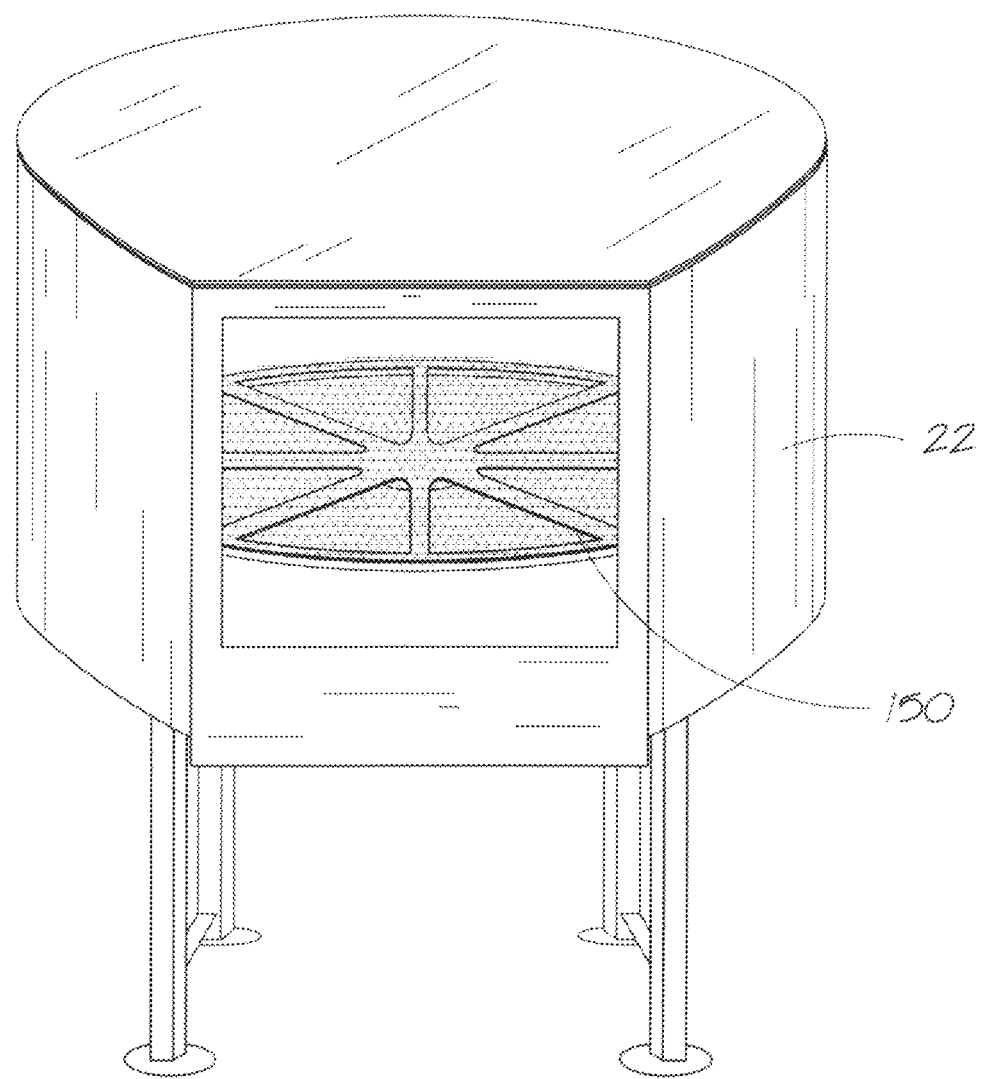
FIGS. 10 and 11 are respective assembly and exploded views of a second embodiment of the present invention, in which the upper receiver is provided with a grill structure that replaces the heating panel of the prior art.
Figure 11:
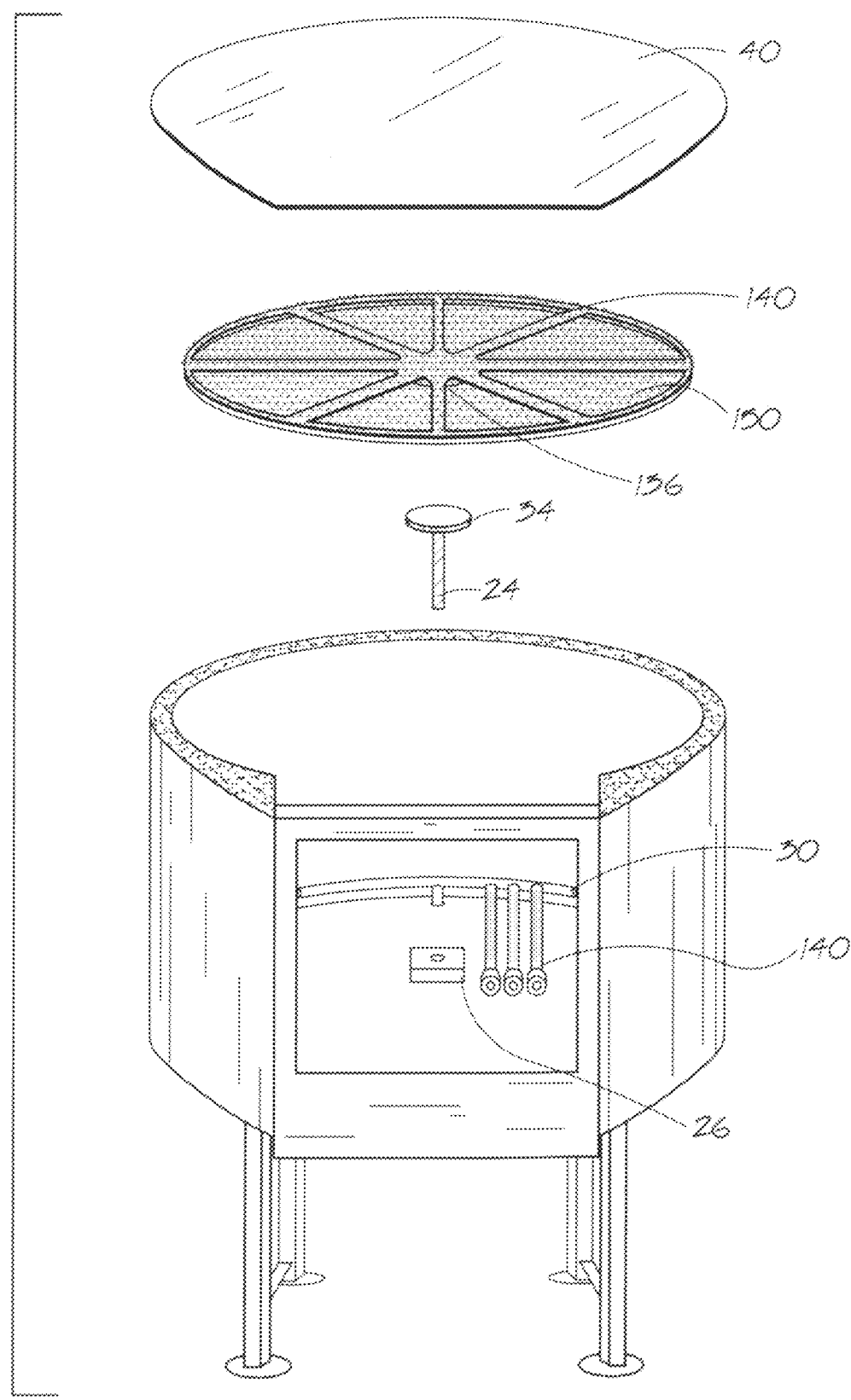
Figure 12:
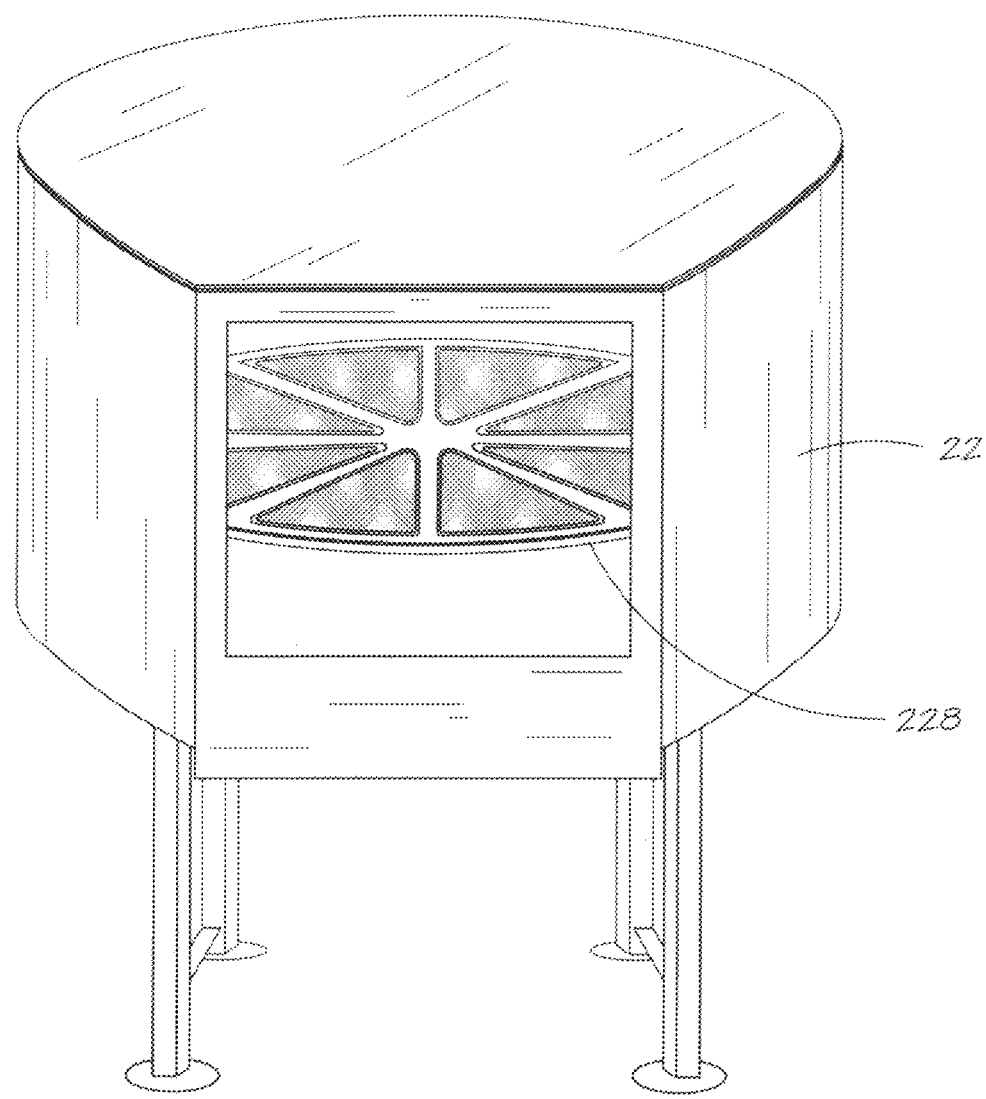
FIG. 12 perspective view of a third embodiment of the invention.

In FIGS. 10-11 is shown an embodiment of the present invention in which, in housing 22, heating panel 20 is not used at all. In this embodiment, a perforated or grill-like material 150 is adhered, preferably beneath receiver 136 and diametric strips 140, to form a new type of rotational cooking panel, although one not having the thermal capacity of cooking panel 20 in the prior art. The embodiment of FIGS. 10-11 is particularly applicable to cooking of certain meats and foods which do not require the high thermal capacity of panel 20. Beneath receiver 136 in FIG. 11 may be employed a similar cradle driver plate 34, and connection of the type shown and described with reference to FIGS. 7-9 above. Further shown in FIG. 11 are additional gas heating elements 140 depending from gas burner supply channel 30 and axle journal 26.

Figure 13:
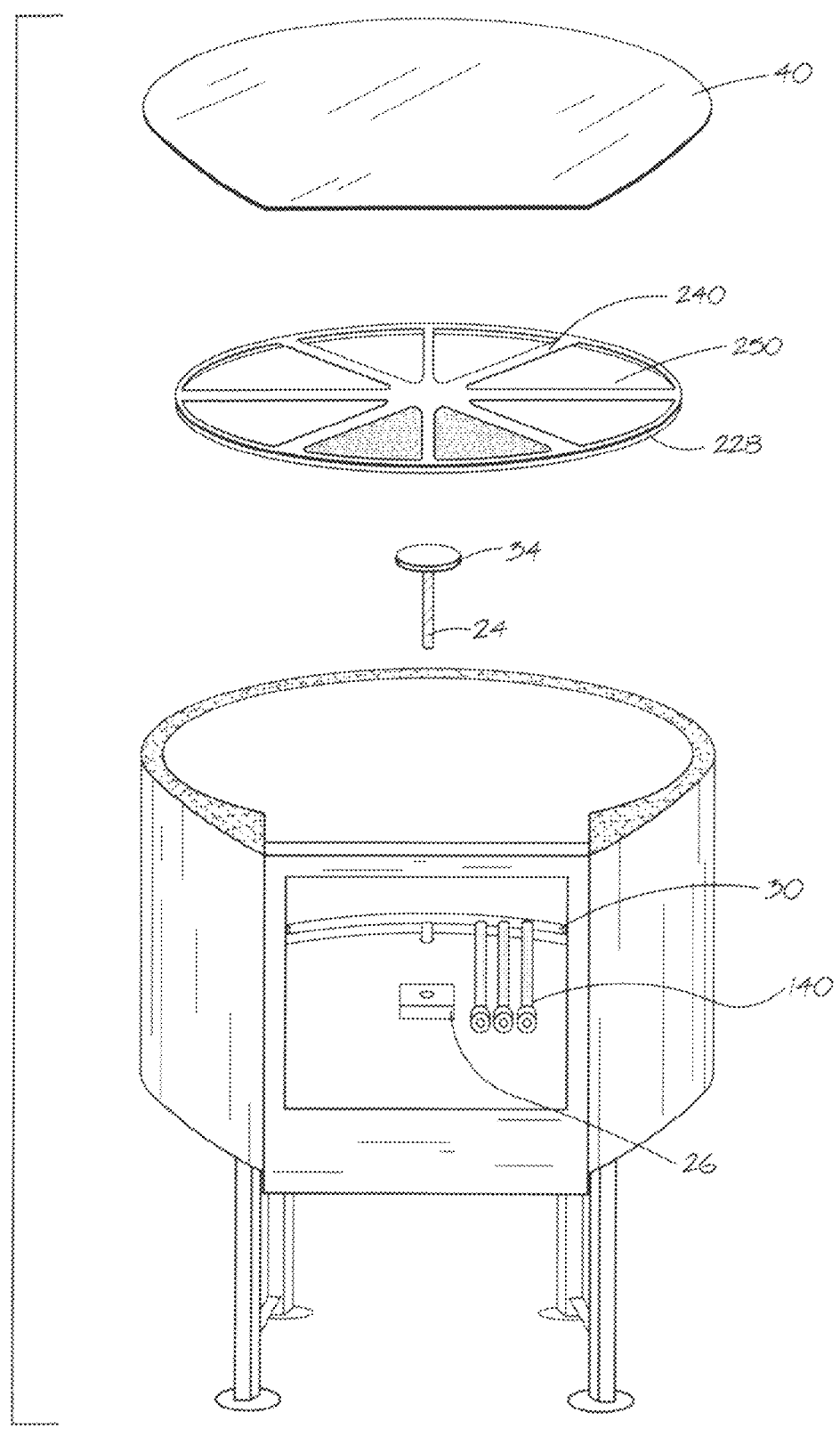
FIG. 13 is an exploded view of the embodiment of FIG. 12.
Figure 14:
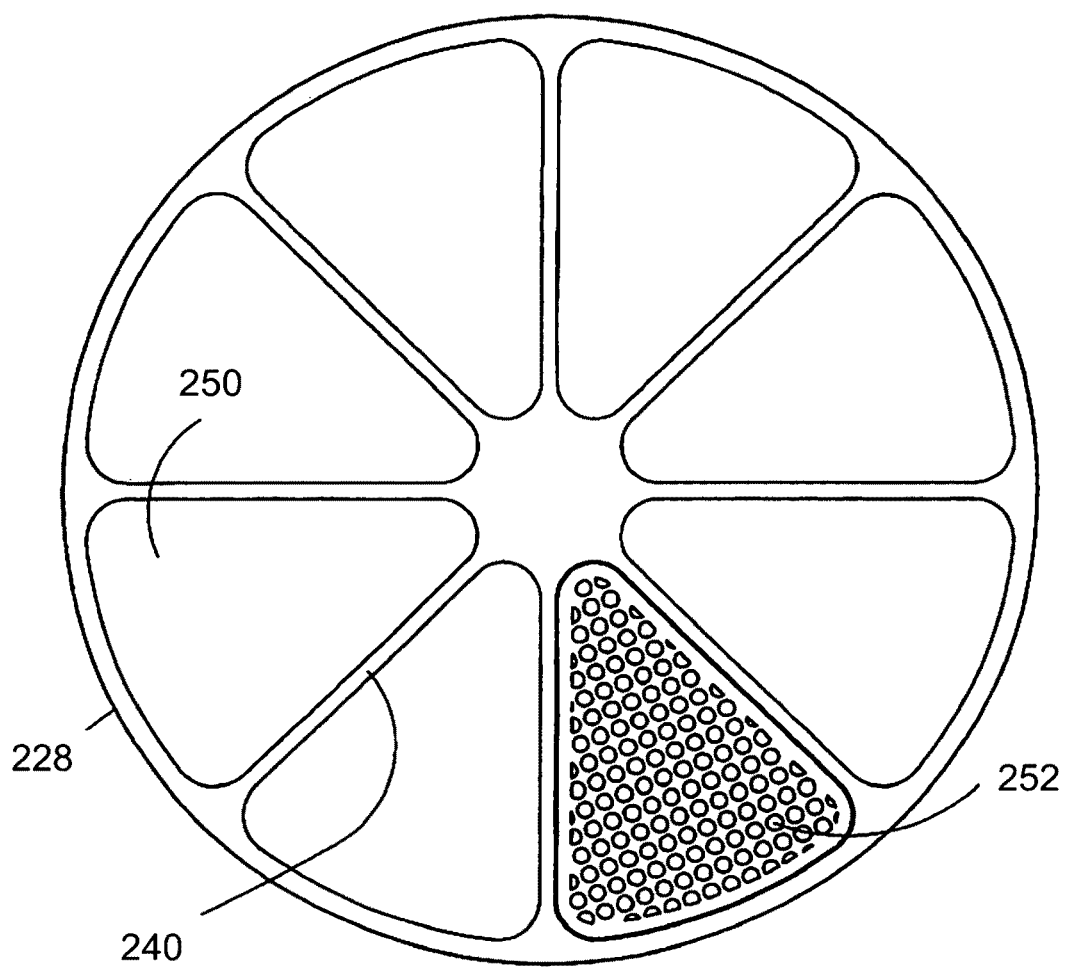
FIG. 14 is a top plan view of an upper cradle in accordance with the embodiment of FIGS. 12 and 13.
Figure 15:
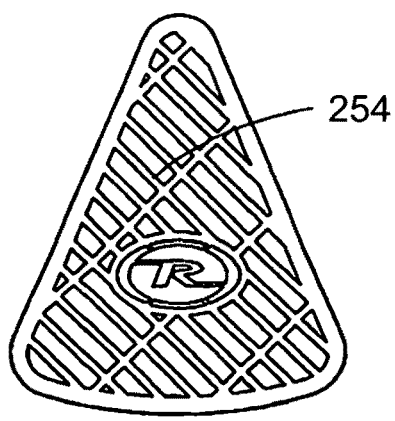
FIG. 15 is a top plan view of an insertion element usable in the cradle of FIG. 14.

In FIG. 12-15 are shown a further embodiment in which, in housing 22, rotational element 238 is divided into a plurality of pie-segment shaped recesses 250 which may accommodate foods for one or more forms of cooking. Another compartment 252 thereof may be provided within a pie-segment shaped grill 254 upon which may be placed foods having different cooking requirement. Rotational element 228 (see FIG. 12) comprises a grill plate for the cooking of foods which may also utilize removable cooking pods 254 (See FIG. 15) placed within the pie shaped recess 250, such that a user may readily place different types or groups of food to be cooked within the geometry of recesses 250 of rotational element 228 over which grill 254 may or may not be placed. Partitions 240 separate the respective recesses 250. Further shown in FIG. 13 is gas burner supply channel 30.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth herewith.

I claim:

1. A system for providing a rotatable grilling surface for a carousel oven having a rotational axle, said system comprising:
   (a) a drive plate disposed at an uppermost end of said rotational axle;
   (b) a flat upper receiver comprising a plurality of diametric strips formed of a high density material; and
   (c) a cradle proportioned for complemental fit upon said drive plate, said cradle being positioned polarly symmetrically about said axle, and said cradle being operatively positioned between said drive plate and said upper receiver,
   wherein said cradle further positioned at or integrally secured to bottom of said flat upper receiver,
   wherein said system comprises a first grill surface securely positioned above or below said plurality of diametric strips,
   wherein a plurality of compartment provided within said first grill surface,
   wherein said first grill surface comprises a plurality of substantially triangular recesses,
   wherein a plurality of removable cooking pods placed within said triangular recesses,
   wherein each of said plurality of triangular recesses comprises a corresponding plurality of selectably insertable placed pods,
   wherein each pod of said plurality of selectably insertable pods may be covered with a second grill surface.

* * * * *